April 22, 1941.  E. E. MOYER  2,239,429
ELECTRIC REGULATING SYSTEM
Filed March 17, 1938
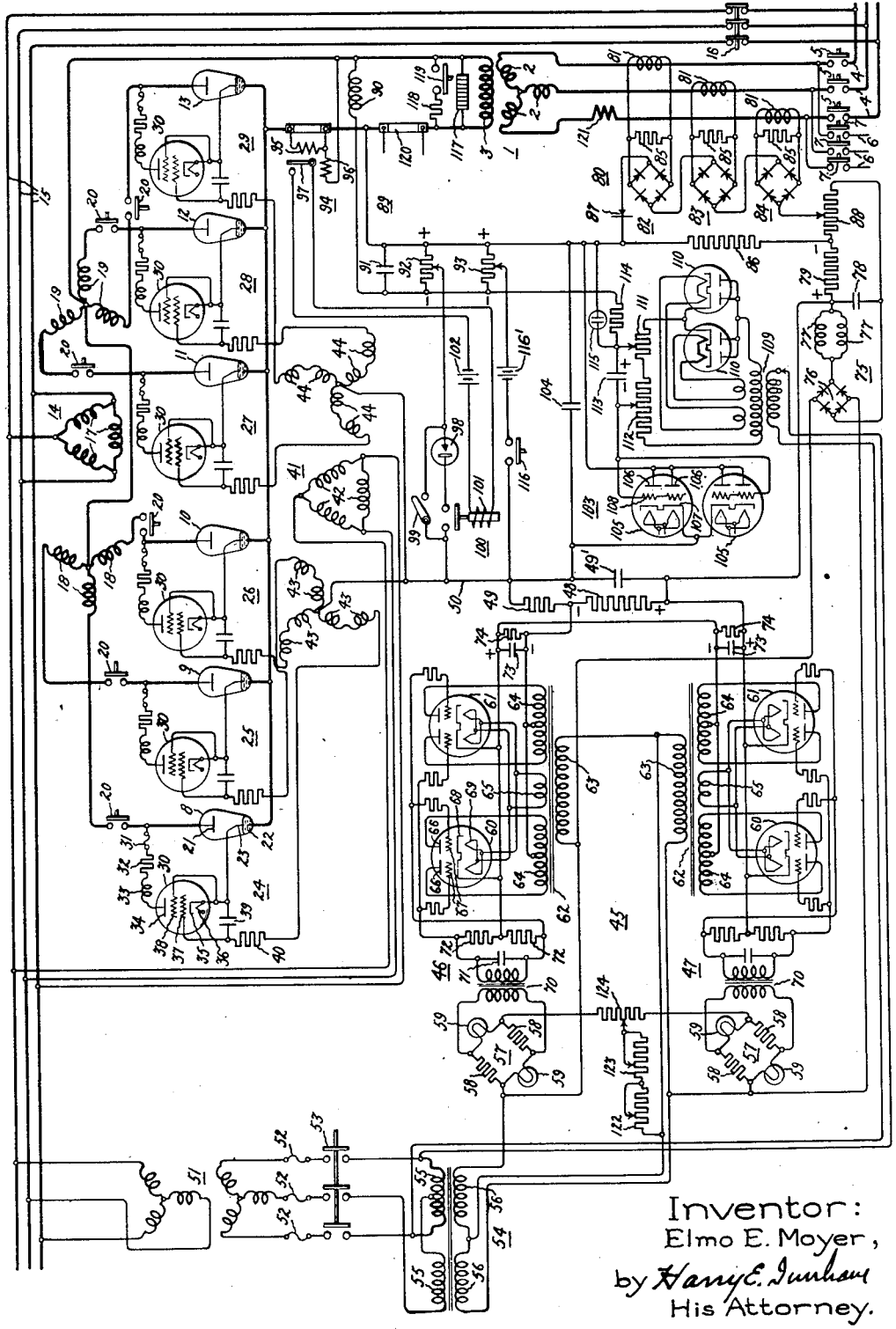
Inventor:
Elmo E. Moyer,
by Harry E. Dunham
His Attorney.

Patented Apr. 22, 1941

2,239,429

UNITED STATES PATENT OFFICE 2,239,429

ELECTRIC REGULATING SYSTEM

Elmo E. Moyer, Scotia, N. Y., assignor to General Electric Company, a corporation of New York Application March 17, 1938, Serial No. 196,456

29 Claims. (Cl. 172—246)

My invention relates to electric regulating systems and more particularly to systems employing electric valve means for controlling dynamo-electric machines. Although not limited thereto, my invention more specifically relates to electric valve regulating systems of the type shown and claimed in United States Letters Patent No. 2,074,947, granted March 23, 1937, on an application of J. L. Stratton and assigned to the assignee of the present application.

It has been found desirable in many electric valve circuits, which employ immersion-ignitor or make-alive control members, to energize the immersion-ignitor control members through excitation circuits which are connected between the anode of the electric valve and the immersion-ignitor control member. The excitation or control circuit may comprise a control electric valve which determines the time during the positive half cycles of applied anode-cathode voltage at which the main valve is rendered conductive. When the time of energization of the control member is retarded to an extremely late point in the positive half cycle of applied voltage, the control circuit and hence the immersion-ignitor control member tends to carry the load current due to the fact that an arc discharge has not been established between the anode and the cathode of the electric valve. In view of this feature, it has become evident that there is a decided need for apparatus which assures that a predetermined minimum current is conducted by the electric valve even though the associated apparatus dictates a lower current value. In accordance with my invention, I provide improved control circuits which obviate many of the disadvantages of the prior art arrangements without sacrificing the flexibility and precision of control required for satisfactory operation.

In excitation systems for dynamo-electric machines where electric valve means have been employed to transmit variable amounts of unidirectional current to the field winding or to control the voltage of an associated circuit, it has been found that under transient conditions excessive loads have been imposed on electric valve apparatus due to the changes, particularly the decrements, in the stored field energy. For example, if the electric valve apparatus is employed to transmit variable amounts of unidirectional current to a field winding of a synchronous condenser, the control of the electric valves being effected by means of a voltage determining circuit, when the voltage determining circuit dictates a rapid reduction in the field energization of the condenser it is necessary to dissipate the decrement of the stored energy of the field. In the absence of auxiliary apparatus, this decrement of stored field energy is dissipated by causing the electric valve apparatus to transmit a sustained current of large value which may deleteriously affect the particular valve which was last conducting. Therefore, there has been evidenced a decided need for improved control apparatus which permits rapid changes in field energization of dynamo-electric machines without imposing severe overload conditions on the electric valve apparatus.

It is an object of my invention to provide a new and improved electric valve regulating system.

It is another object of my invention to provide a new and improved electric valve regulating system adaptable for use in electric translating circuits generally.

It is a further object of my invention to provide a new and improved electric valve regulating system for dynamo-electric machines.

In accordance with the illustrated embodiment of my invention, I provide a new and improved electric valve translating circuit for energizing a field circuit of a dynamo-electric machine of the synchronous type. Direct current is transmitted to the field winding through the electric valve apparatus which is energized from an alternating current circuit. The electric valve means are of the type comprising immersion-ignitor control members. The control members of the electric valves are energized through excitation circuits which are connected to be energized in accordance with the voltage applied across the anode and cathode of the associated electric valve. Control of the amount of current transmitted by the electric valve is obtained by varying the time during each positive half cycle of applied anode-cathode voltage at which the immersion-ignitor control member is energized. Each of the excitation circuits includes a control electric valve which is provided with a grid which renders the control valve conductive at the desired time. A regulating system produces a negative unidirectional biasing potential which varies in accordance with one predetermined controlling influence, such as the voltage of an associated circuit or the voltage of a machine, and produces a second negative unidirectional biasing potential which varies in accordance with another controlling influence such as the current of the associated circuit or the current of the machine. To limit the maximum current conducted by the electric valve means, I provide a circuit which is responsive to the energization of the field circuit and which controls the resultant unidirectional biasing potential impressed on the control grid of the control electric valve when the current transmitted to said field winding tends to exceed a certain value. When this limit is reached, the resulting system maintains a substantially constant current in the field winding of the machine and nullifies the effect of the other controlling elements of the regulating system. In addition, I provide means for assuring that the electric valves conduct a minimum current. This last mentioned means may comprise a variable impedance element, such as an electric discharge device, which limits the maximum resultant negative unidirectional biasing potential impressed on the control grids of the control electric valves. In this manner the immersion-ignitor control members are energized so that arc discharges are established between the anodes and the cathodes of the main electric valves to prevent the occurrence of the condition under which the field current is transmitted through the control electric valve and the associated immersion-ignitor control member.

In accordance with another feature of my invention, I provide an electric valve circuit for energizing the field winding of a dynamo-electric machine in which energy may be transmitted, during transient conditions, from the field winding to the associated circuit to which the machine is connected, or to the circuit which under normal conditions energizes the field winding. An electric valve circuit transmits variable amounts of unidirectional current to the field winding of the machine, during normal conditions of operation, from an alternating current circuit, and serves as an inverter under transient conditions to transmit energy from the field winding to the alternating circuit thereby de-energizing the field winding.

For a better understanding of my invention, reference may be had to the following description taken in connection with the accompanying drawing and its scope will be pointed out in the appended claims. The single figure of the accompanying drawing diagrammatically illustrates my invention as applied to an electric valve regulating system for a synchronous condenser.

Referring to the single figure of the accompanying drawing, my invention is diagrammatically illustrated as applied to an electric valve translating system for controlling and regulating a dynamo-electric machine of the synchronous type, such as a synchronous condenser 1, having armature windings 2 and a field winding 3. The armature windings 2 may be connected to an alternating current circuit 4 through a circuit breaker 5. An auxiliary source of starting voltage 6 and a circuit breaker 7 may be employed to start the synchronous condenser 1, if the machine is provided with an amortisseur winding.

Electric valve translating apparatus including electric valves 8–13, inclusive, and a transformer 14 are arranged to transmit unidirectional current to the field winding 3 which constitutes a load circuit for the translating apparatus. The electric translating apparatus may be energized from any suitable source of alternating current and is shown as being connected to the alternating current supply circuit 4 through conductors 15 and a circuit controlling means or circuit breaker 16. The transformer 14 may comprise primary winding 17 and groups of secondary windings 18 and 19 which are arranged to produce a six-phase system of alternating voltages. If desired, suitable anode contactors 20 may be connected in series relation with the electric valves 8–13. The electric valves 8–13 are preferably of the type employing an ionizable medium, such as a gas or a vapor, and each comprises an anode 21, a cathode of the self-re-constructing type, such as a mercury pool cathode 22, and a control member 23 of the make-alive or the immersion-ignitor control member type. The immersion-ignitor control members 23 are of a material having a substantially greater electrical resistivity than that of the associated mercury pool cathode 22. These control members may be constructed of a suitable material such as boron-carbide and silicon-carbide, or of the material disclosed and claimed in United States Letters Patent No. 1,822,742, granted September 8, 1931, on an application of Karl B. McEachron and assigned to the assignee of the present application. In order to establish an arc discharge between the anode 21 and the cathode 22, it is necessary that a predetermined minimum critical value of current be transmitted through the immersion-ignitor control members 23. The main or power arc discharge path of each of the electric valves 8–13, of course, lies between the anode 21 and the cathode 22.

Excitation circuits 24–29 are associated with electric valves 8–13, respectively, and may be connected to be responsive to the anode-cathode voltage of the associated main power electric valve. Each of the excitation circuits 24–29 includes a control electric valve 30 which may be connected between the anode 21 and the immersion-ignitor control member 23 of the associated electric valve through a current limiting means such as a fuse 31, a resistance 32 and an inductive reactance 33. The control electric valves 30 are preferably of the type employing an ionizable medium and each comprises an anode 34, a cathode 35, a filament or cathode heating element 36 therefor and a control member or grid 37. If desired, the electric valves 30 may be of the type employing a screen or shield grid 38 which is connected to a point less positive than the anode and may be connected directly to the cathode. A capacitance 39 is connected between the cathode 35 and the control grid 37 to absorb transient voltage variations which may be present in the grid circuit. A current limiting resistance 40 may be connected in series relation with the control grid 37 and the regulating system described hereinafter. In order to impress on the control grids 37 of electric valves 30 in excitation circuits 24–29 alternating voltages preferably having a lagging phase displacement relative to the anode-cathode voltages of the respective control electric valves, I employ a transformer 41 having primary windings 42 and groups of secondary windings 43 and 44.

The voltage determining circuit of the regulating system may be of the type disclosed and broadly claimed in the above identified Stratton patent and may include a voltage determining circuit 45 which is energized in accordance with the voltage of the alternating current supply circuit 4, or in accordance with an electrical characteristic of machine 1 such as the armature voltage of the machine. The voltage determining circuit 45 includes a pair of electric circuits 46 and 47 which are connected to introduce into the excitation circuits 24—29 a negative unidirectional biasing potential which varies in accordance with the voltage of the machine 1 or in accordance with the voltage of circuit 4. The electric circuits 46 and 47 are connected to produce this negative biasing voltage conjointly and are arranged to produce it independently in the event one of the circuits becomes temporarily inoperative. The output voltages of the circuits 46 and 47 are arranged to circulate a unidirectional current through a resistance 48; and the resistance 48 is connected to the neutral connections of the secondary windings 43 and 44 of transformer 41 through a resistance 49 and a conductor 50. A filtering capacitance 49' may be connected across resistances 48 and 49.

Considering the voltage determining circuit 45 more particularly, the circuit may be connected to conductors 15 through a transformer 51, current limiting devices such as fuses 52, and a circuit interrupter 53. A transformer 54, which is arranged in a Scott or T connection, is arranged to produce a two-phase system of voltages. Circuit 46 is connected across one phase of the output circuit of transformer 54 and circuit 47 is connected across the other circuit. Primary windings 55 of transformer 54 are connected to the three phase circuit including conductors 15, and secondary windings 56 are connected to circuits 46 and 47. Circuits 46 and 47 are similar in construction and arrangement and each includes an electric network or bridge 57 having a pair of linear resistance elements 58 and a pair of resistance elements 59 having nonlinear characteristics. The bridge circuit 57 produces an amplified voltage which varies in accordance with the voltage of circuit 4 or the voltage of machine 1. Circuit 46 may include a pair of electric valves 60 and 61 and a transformer 62 which produce across the terminals of resistance 48 a negative biasing potential which varies in accordance with the output voltage of the bridge 57. Transformer 62 includes a primary winding 63 which is connected to be energized from one phase of the output circuits of transformer 54, a pair of secondary windings 64 which supply anode-cathode voltage for the electric valves 60 and 61, and a tertiary winding 65 which supplies cathode heating current for the electric valves. The electric valves 60 and 61 are arranged to supply conjointly the current to resistance 48 so that in the event one of the electric valves becomes temporarily inoperative the other electric valve will perform this function. Electric valves 60 and 61 are preferably of the high vacuum type and may each include a pair of anodes 66, a pair of control members 67, a pair of cathodes 68 and heating elements 69. The output voltage of the bridge circuit 57 is impressed on the control members 67 of electric valves 60 and 61 through a circuit including a transformer 70, a capacitance 71 which serves to compensate for magnetizing current consumed by transformer 70, and a voltage divider including resistance 72. A parallel connected capacitance 73 and a resistance 74 are connected across the output circuits of electric valves 60 and 61.

To introduce into the excitation circuits 24—29 a positive unidirectional biasing potential of substantially constant value, I employ a circuit 75 including a suitable rectifier, such as a full wave rectifier 76, smoothing inductive reactances 77, a capacitance 78 and a resistance 79.

As an agency for controlling the electric valves 8–13 to limit the excitation of the field winding 3 and hence to limit the load on machine 1 in accordance with a predetermined controlling influence, such as the current in the armature windings 2 of machine 1, I provide a circuit 80 which may include current transformers 81, rectifiers 82, 83 and 84, and resistances 85. The rectifiers 82–84 are connected in series relation and tend to circulate a unidirectional current through a resistance 86 which is connected in circuit with resistance 79, resistances 48 and 49, conductor 50, secondary windings 43 and 44 of transformer 41, control electric valves 30 and the immersion-ignitor control members 23. A unidirectional conducting device 87 may be connected in series relation with the rectifiers 82–84 to assure that only unidirectional current is transmitted through resistance 86 and to improve the inverse voltage characteristic of rectifiers 82–84. In order to obtain a drooping voltage characteristic of machine 1 when the armature current of machine 1 or the load of machine 1 exceeds a predetermined value, I employ an adjustable resistance 88 which is connected in series relation with resistance 79. The voltage produced by the serially connected rectifiers 82–84 will not circulate a current through resistance 86 until it reaches a predetermined value established by the adjustment of resistance 88, since the voltage appearing across the resistance 88 is in opposition to that produced by rectifiers 82–84.

I provide a circuit 89 for producing a voltage which varies in accordance with the energization of field winding 3. The circuit 89 may include a high-impedance filter circuit comprising an inductance 90 and a capacitance 91 and a pair of voltage dividers 92 and 93. As a means for limiting the maximum amount of current which may be transmitted to the field winding 3 in accordance with an electrical condition of the field winding 3 or in accordance with an electrical characteristic of the machine 1, I provide a circuit including a relay 94 which may be arranged to be responsive to the temperature of the field winding 3. The relay 94 may include a current coil 95, a voltage coil 96 and an armature 97 which serves to complete a circuit to maintain at a substantially constant value the resultant unidirectional voltage impressed on the control members 37 of the control electric valves 30. Unidirectional conducting means, such as a rectifier 98, is arranged to be connected between conductor 50 and the adjustable element of the voltage divider 92, thereby providing a path for unidirectional current and serving to render ineffective the unidirectional voltages produced by circuits 45, 75 and 80 or to limit the magnitude of the resultant unidirectional voltage. The unidirectional conducting device 98 may be of the electric discharge type, either of the high vacuum or of the type employing ionizable mediums such as gases or vapors. A switch 99 may be connected across the electric valves of the rectifying devices 98 to serve as a manual means for controlling the energization of the field winding 3 within a limited range. A relay 100 having an actuating coil 101 is connected to be energized from a suitable source of current such as a battery 102 when the relay 94 is in the closed circuit position.

I provide a circuit 103 which controls the electric valve means 8–13 to limit the minimum current conducted by these electric valves and to control the electric valves to operate as an inverter during transient conditions of machine 1, The circuit 103 may include a capacitance 104 and a parallel connected variable impedance means, such as a pair of electric valves 105, which are preferably of the high vacuum type. Each of the electric valves may include a pair of anodes 106, a pair of cathodes 107 and a pair of control members 108. The electric valves 105 serve as a variable impedance means connected across the capacitance 104 and operate to maintain a predetermined maximum negative unidirectional biasing potential in the excitation circuits 24–29. As a source of variable or adjustable unidirectional biasing potential for energizing the control members 108 of electric valves 105, I provide a circuit including a transformer 109, a pair of electric discharge devices 110, adjustable resistances 111 and 112 which are connected in the output circuits of valves 110, and a capacitance 113 which is connected between certain portions of resistances 111 and 112. The negative terminal of the voltage divider 93 is connected to the positive terminal of capacitance 113 through a resistance 114. A voltage limiting device, such as a glow discharge valve 115, may be connected across the portion of the circuit 103 connected to voltage divider 93 to limit the maximum voltage impressed on circuit 103. Resistances 111 and 112 are adjusted so that the electric valves 105 are biased to cut off within the normal range of energization of the field winding 3, but are arranged to raise the potential of the control members 108 when the energization of the field winding 3 decreases below the predetermined minimum value. It is to be noted that the capacitance 104, the voltage of which is controlled by the electric valves 105, is connected to shunt the unidirectional biasing potentials produced by circuits 45, 75 and 80, thereby providing a means for limiting the maximum value of the resultant negative unidirectional biasing potential introduced into the excitation circuits 24–29. In other words, circuit 103 controls electric valves 30 so that the phase of the resultant voltages impressed on control grids 37 is not retarded beyond a predetermined angle to assure the proper energization of the immersion-ignitor control members and to effect the establishment of arc discharges between anodes 21 and cathodes 22 even under those conditions when the remainder of the regulating system dictates a lower current value for field winding 3. Where feed-back voltage of the field winding is not great enough to control the other circuit voltages, this circuit 103 can be used to boost the feed-back voltage, i. e., amplify it.

A contactor 116 is connected across conductor 50 and voltage divider 93 to serve as a pre-setting means for the field current supplied to the winding 3 during starting operations and, of course, fixes the resultant biasing potential impressed on control grids 37 of electric valves 30 during a predetermined part of the starting sequence of the synchronous condenser 1. A suitable source of voltage, such as a battery 116', may be used to establish the resultant grid voltage during such starting operation when the voltage from the field circuit alone is not sufficient for this purpose.

A suitable voltage limiting means, such as an impedance element 117 having a nonlinear impedance-current winding, may be firmly connected across the field winding 3 to limit the discharge voltage thereof. A field discharge resistance 118 may be connected across the field winding 3 by a contactor 119 during the starting operation. A suitable means, such as a resistance or shunt 120, may be connected in series relation with the field winding 3 to provide a voltage to indicate the amount of unidirectional current transmitted to field winding 3 during the starting operation, and a relay, including a coil 121, may be connected in series relation with the armature windings 2 to obtain an indication when the armature current of the synchronous condenser decreases below a predetermined value to dictate a change from the starting voltage circuit 6 to the running circuit condition. The associated control apparatus for starting the synchronous condenser 1 has not been shown in detail. However, it is to be understood that auxiliary control apparatus may be employed to start the condenser 1 from circuit 6 and to connect it to the alternating current circuit 4.

As a means for initially adjusting the magnitude of the negative unidirectional biasing potential produced by the voltage determining circuit 45, I employ adjustable resistances 122 and 123 and a voltage divider 124 which is connected between the bridge circuit 57 and circuits 46 and 47. The resistances 122 and 123 are initially adjusted so that within the normal range of load of machine 1 the voltage appearing across the terminals of resistance 48 controls the electric valve circuit.

The operation of the embodiment of my invention as shown in the single figure of the drawing will be described by considering the system when the machine 1 is operating as a synchronous condenser to transmit power to the alternating current circuit 4. Of course, circuit breakers 5, 16, 20 and 53 are in the closed circuit positions. Unidirectional current is transmitted to the field winding 3 through transformer 14 and the power electric valves 8–13. The control electric valves 30 in excitation circuits 24–29 transmit current to immersion-ignitor control members 23 at the desired time during each positive half cycle of applied anode-cathode voltage to render the electric valves conductive. Of course, it is understood that the average current conducted by these electric valves is maximum when the arc discharges are initiated at the beginning of the positive half cycles of applied voltage and that the average current decreases as the time of initiation of the arc is retarded. The control or regulating system varies the resultant voltage impressed on the control grids 37 of the control valves 30 to vary the time during each cycle at which the electric valves 8–13 are rendered conductive.

The voltage determining circuit 45 produces a negative unidirectional biasing potential across the resistances 48 and 49. The magnitude of this negative biasing potential varies in a direction to tend to maintain the terminal voltage or the voltage of circuit 4 at a substantially constant value. For a more complete explanation of the operation of the voltage determining circuit 45, reference may be had to the above identified Stratton patent. The circuit 80 introduces a negative unidirectional biasing potential into the control system through resistance 86 when the current transmitted by the machine 1 exceeds a predetermined value. In this manner, the energization of the field winding 3 is additionally controlled by the circuit 80 and after the normal range of load is exceeded the energization of the field winding 3 is controlled to produce a drooping characteristic in accordance with the armature current.

In the event the field current transmitted to winding 3 exceeds the normal range of operation, the relay 94 effects energization of relay 100 after a predetermined time to control the resultant unidirectional biasing voltage impressed on control grids 37 and hence tends to maintain a substantially constant current in field winding 3 until the field resistance or temperature decreases. It is to be noted that a certain portion of the voltage appearing across the field winding 3 is fed back into the excitation circuits 24–29 through a circuit including voltage divider 92, resistance 86, resistance 79 and resistances 48 and 49.

On the other hand, if the voltage determining element 45 of the system dictates a reduced field energization, the minimum field current is limited by the circuit 103. Within the normal range of operation electric valves 105 are biased to the non-conducting condition by adjustment of resistances 111 and 112, thereby permitting the other elements of the regulating system to carry out their intended functions. However, if the energization of the field winding 3 decreases sufficiently so that the voltage appearing thereacross is decreased below a predetermined minimum value, the potentials of the control members 108 are raised sufficiently to render the electric valves 105 conductive. In this manner, the electric valves 105 act as variable impedance elements to short circuit intermittently the capacitance 104, thereby limiting the maximum negative unidirectional biasing potential which is impressed on the control grids 37. As soon as the energization of the field increases sufficiently, the electric valves 105 are again biased to the nonconducting condition thereby permitting the regulating system to assume control.

Under those conditions where the system requirements are such as to demand a relatively large field excitation followed by a sustained decrease to subnormal excitation, it is of course necessary to decrease the field current. In addition, it may be necessary to dissipate or transmit a portion of the field energy when the voltage determining circuit 45 dictates a rapid and substantial decrease in the energization of the field winding. The electric valve control system, of course, tends to decrease rapidly the field current. However, the stored field energy causes the field current to continue to flow. It is important to prevent cut-off of the electric valves under such conditions so that the current is not transmitted by a single electric valve. Circuit 103 controls the maximum negative biasing potential so that valves 8–13 are never rendered completely nonconductive, thereby assuring that the electric valves 8–13 are maintained in condition for operation as an inverter to transmit power from the field winding 3 to circuit 4. Since the alternating components of voltage impressed on grids 37 of electric valves 30 are lagging the anode voltages, and since there is a limit set to the maximum negative unidirectional biasing potential, electric valves 8–13 are in condition to operate as an inverter to deenergize the field winding 3 a predetermined amount. The resultant grid voltages are in that region suitable for inverter operation. Within a predetermined range of voltage of the alternating current circuit 4, the electric valve system varies the energization of the field winding in accordance with the voltage variations of circuit 4. However, if the decrease in the energization of the field circuit, which is dictated by the voltage-responsive circuit 45, exceeds a predetermined amount or dictates a voltage less than the lower limit of the range, the circuit 103 controls the electric valves 8–13 so that the decrement of stored field energy is transmitted to circuit 4.

Let it be assumed that the electric valve system is operating to transmit a unidirectional current to the field winding 3 of the machine 1 in accordance with the voltage conditions of the circuit 4. If the voltage conditions of the circuit 4 change rapidly so that it is necessary to effect a rapid and substantial reduction in the energization of the field winding 3, the voltage determining circuit 45 will, of course, tend to decrease rapidly the conductivities of the electric valves 8–13 to transmit a much smaller current to field winding 3. In the absence of other control apparatus, such as circuit 103, electric valves 8–13 may be rendered completely nonconductive so that the stored field energy tends to circulate a current through a circuit of the electric valves 8–13, thereby dissipating the decrement of stored field energy. It will be noted that the current, were it not for circuit 103, would be conducted by only one of the electric valves, which would be the one which was last conducting as a rectifier. Of course, this condition would tend to impose a severe overload on this particular valve and in all probability would cause serious damage. However, the electric circuit 103 limits the maximum negative unidirectional biasing potential impressed on grids 37 of electric valves 30 in excitation circuits 24–25 so that the electric valves 8–13 are never rendered completely nonconductive. Due to the fact that the alternating component of voltages impressed on grids 37 is lagging and due to the fact that there is a limited resultant negative unidirectional biasing potential on these grids, under the condition which dictates a rapid deenergization of the field winding 3, the electric valves 8–13 are excited for inverter operation; that is, the control voltages for electric valves 8–13 are in that region which permits inversion so that the direct current of the field winding 3 is transformed into polyphase alternating current by electric valves 8–13 to transmit the decrement of stored field energy to the alternating current circuit 4. The voltage appearing across the terminals of field winding 3 during this transient condition is in a direction to force current through the electric valves 8–13 in the direction proper for inverter operation. In this manner, the electric valves 8–13 carry the current in a predetermined order or sequence and the load is not imposed on any one valve. As soon as the energy of the field winding 3 is reduced to a value in agreement with that dictated by the new voltage condition of circuit 4, the electric valves automatically return to rectifier operation so that the electric valves 8–13 transmit variable amounts of unidirectional current to the field winding 3 to maintain the voltage of circuit 4.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current circuit, a load circuit, electric translating apparatus connected between said circuits and including an electric valve having an anode, a mercury pool cathode and an associated immersion-ignitor control member, said electric valve being characterized by requiring the transmission of a predetermined critical minimum value of current through said control member to initiate an arc discharge between said anode and said cathode, an excitation circuit energized in accordance with the voltage appearing across said anode and said cathode for periodically energizing said control member and comprising a control electric valve, control means for controlling the conductivity of said control electric valve in accordance with a predetermined electrical condition of one of the first mentioned circuits, and means for controlling said control means to limit the minimum conductivity of said control electric valve and for maintaining the current transmitted to said immersion-ignitor control member above said critical value during the periodic energizations thereof.

2. In combination, an alternating current circuit, a load circuit, electric translating apparatus connected between said circuits and including an electric valve having an anode, a mercury pool cathode and an associated immersion-ignitor control member, said electric valve being characterized by requiring the transmission of a predetermined critical minimum value of current through said control member to initiate an arc discharge between said anode and said cathode, an excitation circuit energized in accordance with the voltage appearing across said anode and said cathode for periodically energizing said control member and comprising a control electric valve, control means responsive to an electrical condition of said load circuit for controlling the conductivity of said control electric valve, and means for controlling said control means and for maintaining the current transmitted to said immersion-ignitor control member above said critical value.

3. In combination, an alternating current supply circuit, a load circuit, electric translating apparatus connected between said circuits and including an electric valve means having an anode, a cathode and a control member characterized by requiring the transmission of a predetermined critical minimum value of current therethrough to initiate an arc discharge between said anode and said cathode, and an excitation circuit for energizing said control member comprising means for impressing thereon an alternating voltage having a lagging phase displacement and means for limiting the minimum conductivity of said electric valve means.

4. In combination, an alternating current circuit, a load circuit, electric translating apparatus connected therebetween and including electric valve means having an anode, a cathode and a control member characterized by requiring the transmission of a predetermined critical minimum value of current therethrough to initiate an arc discharge between said anode and said cathode, and an excitation circuit for energizing said control member comprising means for impressing thereon an alternating voltage having a lagging phase displacement relative to the anode-cathode voltage, means for impressing on said control member a unidirectional biasing potential which varies in accordance with an electrical condition of one of the first mentioned circuits and means for controlling the conductivity of said electric valve means to limit the minimum current conducted thereby.

5. In combination, an alternating current supply circuit, a load circuit, electric translating apparatus interconnecting said circuits and including an electric valve means having an anode, a cathode and an associated control member of the immersion-ignitor type characterized by requiring the transmission of a predetermined critical minimum value of current therethrough to initiate an arc discharge between said anode and said cathode, and an excitation circuit for energizing the immersion-ignitor control member comprising a control electric valve having an anode, a cathode and a control member, means for impressing on said last mentioned control member an alternating voltage having a lagging phase displacement relative to the anode-cathode voltage, and means for limiting the minimum conductivity of said control electric valve.

6. In combination, an alternating current supply circuit, a load circuit, electric translating apparatus connected between said circuits and including an electric valve means having an anode, a cathode and an immersion-ignitor control member characterized by requiring the transmission of a predetermined critical minimum value of current therethrough to initiate an arc discharge between said anode and said cathode, and an excitation circuit for energizing said immersion-ignitor control member comprising a control electric valve connected to be energized in accordance with the voltage appearing across the anode and cathode of said electric valve means and having a control grid, means for impressing on said control grid a voltage which varies in accordance with an electrical condition of one of the first mentioned circuits and means for limiting the current conducted by said control electric valve to a predetermined minimum value.

7. In combination, an alternating current supply circuit, a load circuit, electric translating apparatus connected between said circuits and including an electric valve means having an anode, a cathode and an associated control member of the immersion-ignitor type characterized by requiring the transmission of a predetermined critical minimum value of current therethrough to initiate an arc discharge between said anode and said cathode, and an excitation circuit for energizing said immersion-ignitor control member comprising a control electric valve connected to be energized in accordance with the voltage appearing across the anode and the cathode of said electric valve means and having a control grid, means for impressing on said grid an alternating voltage having a lagging phase displacement, means for impressing on said control grid a unidirectional voltage which varies in accordance with an electrical condition of one of said first mentioned circuits and means for limiting the value of said unidirectional voltage to maintain a predetermined minimum conductivity of said control electric valve.

8. In combination, an alternating current supply circuit, a load circuit, electric translating apparatus connected between said circuits and including an electric valve means having an anode, a cathode and a control member characterized by requiring the transmission of a predetermined critical minimum value of current therethrough to initiate an arc discharge between said anode and said cathode, and an excitation circuit for energizing said control member comprising means for impressing thereon an alternating voltage having a lagging phase displacement, means for impressing on said control member a unidirectional voltage and means for limiting the maximum conductivity of said electric valve means and for limiting the minimum conductivity of said electric valve means.

9. In combination, an alternating current supply circuit, a load circuit, electric translating apparatus connected therebetween and including an electric valve means comprising an anode, a cathode and a control member characterized by requiring the transmission of a predetermined critical minimum value of current therethrough to initiate an arc discharge between said anode and said cathode, and an excitation circuit for energizing said control member comprising means for impressing thereon an alternating voltage having a lagging phase displacement, means for impressing on said control member a biasing potential which varies in accordance with an electrical condition of said load circuit and means for controlling the magnitude of said biasing potential to limit the minimum and the maximum conductivities of said electric valve means.

10. In combination, an alternating current supply circuit, a direct current load circuit, electric translating apparatus connected therebetween and including an electric valve means having an anode, a cathode and a control member characterized by requiring the transmission of a predetermined critical minimum value of current therethrough to initiate an arc discharge between said anode and said cathode, an excitation circuit for energizing said control member comprising means for impressing thereon an alternating voltage having a lagging phase displacement relative to the anode-cathode voltage, means for impressing on said control member a positive unidirectional biasing potential and means for impressing on said control member a negative unidirectional biasing potential, and means connected between said load circuit and said excitation circuit for controlling the magnitude of the resultant unidirectional biasing potential to control the conductivity of said electric valve means.

11. In combination, an alternating current supply circuit, a direct current load circuit, electric translating apparatus connected therebetween and including an electric valve means having an anode, a cathode and a control member characterized by requiring the transmission of a predetermined critical minimum value of current therethrough to initiate an arc discharge between said anode and said cathode, and an excitation circuit for energizing said control member comprising means for impressing thereon a negative unidirectional biasing potential which varies in accordance with the voltage of said alternating current circuit, means responsive to the energization of said direct current load circuit for producing a unidirectional control voltage and means comprising a parallel connected capacitance and an electric discharge device for controlling the magnitude of the resultant unidirectional biasing potential impressed on said control member.

12. In combination, an alternating current supply circuit, a direct current load circuit, electric translating apparatus connected therebetween and including an electric valve means having an anode, a cathode and a control member characterized by requiring the transmission of a predetermined critical minimum value of current therethrough to initiate an arc discharge between said anode and said cathode, an excitation circuit for energizing said control member comprising means for impressing thereon a negative unidirectional biasing potential which varies in accordance with the voltage of said alternating current circuit, means responsive to the energization of said direct current load circuit for producing a unidirectional control voltage, means comprising a parallel connected capacitance and an electric discharge device for controlling the magnitude of the resultant negative unidirectional biasing potential impressed on said control member, and means for limiting the maximum current transmitted to said load circuit.

13. In combination, a dynamo-electric machine having a field winding, a source of current, electric translating apparatus interposed between said source and said field winding and including electric valve means for transmitting current thereto, means for controlling said electric valve means to vary the energization of said field winding in accordance with a predetermined controlling influence, and means responsive to the energization of said field winding for controlling said electric valve means and for maintaining substantially constant current in said field winding when the energization thereof tends to exceed a predetermined value.

14. In combination, a dynamo-electric machine having a field winding, a source of current, electric translating apparatus connected between said source and said field winding and comprising electric valve means for transmitting unidirectional current thereto, said electric valve means having an anode, a cathode and a control member, an excitation circuit for energizing said control member comprising a control electric valve having a control grid, means for impressing on said grid a unidirectional biasing potential which varies in accordance with a predetermined controlling influence, means for impressing on said grid a second biasing potential which varies in accordance with a second controlling influence, means responsive to the energization of said field winding for limiting the resultant unidirectional voltage impressed on said grid when the energization of said field winding tends to exceed a predetermined value, and means for limiting the minimum energization of said field winding.

15. In combination, a dynamo-electric machine having a field winding, a source of current, electric translating apparatus connected between said source and said field winding and comprising electric valve means for transmitting unidirectional current thereto, said electric valve means having an anode, a cathode and a control member, and an excitation circuit for energizing said control member comprising a control electric valve having a control grid, means for impressing on said grid a unidirectional biasing potential which varies in accordance with a predetermined controlling influence, means for impressing on said grid a second biasing potential which varies in accordance with a second controlling influence, means responsive to the energization of said field winding for limiting the resultant unidirectional voltage impressed on said grid when the energization of said field winding tends to exceed a predetermined value and means comprising a variable impedance element for limiting the maximum negative biasing potential impressed on said grid to assure a predetermined minimum energization of said field winding.

16. In combination, a dynamo-electric machine having a field winding, a source of alternating current, electric translating apparatus including an electric valve, means for transmitting unidirectional current to said field winding, said electric valve means having a control member for controlling the conductivity thereof, and an excitation circuit for energizing said control member comprising a control electric valve having a grid, means for impressing on said grid an alternating voltage having a lagging phase displacement, means for impressing on said grid a negative unidirectional biasing potential which varies in accordance with a predetermined controlling influence, means for producing a second unidirectional biasing potential which varies in accordance with a second controlling influence, means for impressing said second biasing potential on said grid only after said second controlling influence attains a predetermined value and means for limiting the resultant negative unidirectional biasing potential impressed on said grid to limit the minimum energization of said field winding.

17. In combination, an alternating current circuit, a dynamo-electric machine having a field winding, electric translating apparatus connected between said circuit and said field winding for transmitting unidirectional current thereto and including an electric valve means having a control member, and an excitation circuit comprising means for impressing on said control member an alternating voltage having a lagging phase displacement, a variably energized impedance element for producing a negative unidirectional biasing potential which varies in accordance with an electrical characteristic of said machine, a second impedance element being variably energized in accordance with a second electrical characteristic of said machine for producing a second negative unidirectional biasing potential, means for impressing said second biasing potential on said control member for values of said second characteristic above a predetermined value and means comprising a parallel connected capacitance and an electric discharge device for controlling the resultant negative unidirectional biasing potential impressed on said control member.

18. In combination, a dynamo-electric machine having a field winding, an alternating current circuit, electric valve apparatus connected between said circuit and said field winding, means for controlling said electric valve apparatus to transmit variable amounts of unidirectional current to said field winding in accordance with a predetermined controlling influence, and means for controlling said electric valve apparatus and for effecting the transmission of energy from said field winding to said alternating current circuit when said first mentioned means dictates a decrease in the energization of said field winding.

19. In combination, a dynamo-electric machine having a field winding, an alternating current circuit, electric translating apparatus connected between said field winding and said circuit and including an electric valve means having a control member, excitation means for controlling the energization of said control member so that said electric valve means transmits variable amounts of unidirectional current to said field winding in accordance with an electrical condition of said machine, and means for controlling said excitation means and for operating said electric translating apparatus as an inverter to transmit energy from said field winding to said alternating current circuit when said electrical condition dictates a decrease in the energization of the field winding.

20. In combination, a dynamo-electric machine having a field winding, an alternating current circuit, electric valve translating apparatus connected between said field winding and said circuit and comprising a control electric valve having an anode, a cathode and a control member, a control circuit for energizing said control member comprising means for impressing thereon an alternating voltage having a lagging phase displacement relative to the anode-cathode voltage and means for impressing on said control member a variable unidirectional biasing potential which varies in accordance with a predetermined controlling influence so that said translating apparatus transmits variable amounts of unidirectional current to said field winding to control an electrical characteristic of said machine, and means for controlling the resultant potential impressed on said control member to excite said electric valve translating apparatus as an inverter to transmit energy from said field winding to said alternating current circuit when said controlling influence dictates a decrease in the energization of said field winding.

21. In combination, an alternating current circuit, a highly inductive direct current circuit, electric valve translating apparatus connected between said alternating current circuit and said direct current circuit, means for controlling said electric valve apparatus in accordance with a predetermined controlling influence to transmit variable amounts of unidirectional current to said direct current circuit within a predetermined range of variation of said controlling influence, and means for controlling said electric valve apparatus for effecting the transfer of energy from said direct current circuit to said alternating current circuit when said first mentioned means dictates a reduction in the energization of said direct current circuit to a value below the lower limit of said range.

22. In combination, an alternating current circuit, a synchronous condenser having an armature winding connected to said circuit and having a field winding, electric valve apparatus connected between said circuit and said field winding for transmitting variable amounts of unidirectional current thereto in accordance with the voltage of said alternating current circuit, a control circuit for said electric valve apparatus comprising an electric valve having an anode, a cathode and a control member, means for energizing the control member to vary the energization of said field winding in accordance with the voltage of said alternating current circuit within a predetermined range of said voltage, and means for energizing the control member to excite said electric valve translating apparatus as an inverter for transmitting energy from said field winding to said alternating current circuit when the voltage of said alternating current suddenly decreases below the lower limit of said range.

23. In combination, an alternating current circuit, a second circuit which is highly inductive, electric valve apparatus connected between said alternating current circuit and said second circuit for transmitting unidirectional current to said second circuit, means for controlling said electric valve apparatus to transmit variable amounts of unidirectional current to said second circuit in accordance with a predetermined controlling influence, and means for controlling said electric valve apparatus and for effecting transmission of energy from said second circuit to said alternating current circuit when said first mentioned means dictates a decrease in the energization of said second circuit.

24. In combination, a dynamo-electric machine having a field circuit, electric translating apparatus for energizing said field circuit and comprising an electric valve means having a control member, means for controlling said electric valve means in accordance with a predetermined controlling influence, means for impressing on said control member a component of voltage derived from said field circuit, and means responsive to a predetermined operating condition of said machine for selectively connecting or disconnecting said last mentioned means from said control member.

25. In combination, an electric circuit, a dynamo-electric machine having an armature winding connected to said circuit and having a field circuit, electric translating apparatus for energizing said field circuit and comprising an electric valve means for controlling the field current, said electric valve means having a control member for controlling the conductivity thereof, a voltage determining circuit connected to said electric circuit for energizing said control member, means for impressing on said control member a component of voltage derived from said field circuit, and means responsive to a predetermined operating condition of said machine for selectively connecting said voltage determining circuit or said last mentioned means in operative relation with said control member.

26. In combination, a dynamo-electric machine having a field winding, an alternating current circuit, and an excitation circuit connected between said field winding and said alternating current circuit to control an electrical condition of said machine and comprising electric valve means of the controlled type having a control member and means for energizing said control member and for controlling said electric valve means to supply power to or to transmit power from said field winding.

27. In combination, a dynamo-electric machine having a field winding, an alternating current circuit, and an excitation circuit connected between said field winding and said alternating current circuit to control an electrical condition of said machine and comprising electric valve means of the controlled type having a control member and means responsive to said electrical condition for energizing said control member and for operating said electric valve means either as a rectifier or an inverter so that power may be transferred in either direction between said field winding and said alternating current circuit.

28. In combination, a dynamo-electric machine having armature and field windings, a source of current, means for variably energizing said field winding from said source comprising electric valve means having a control member, control means for impressing on said control member a voltage which varies in response to an electrical condition of said machine, and means responsive to the energization of said field winding for limiting the range of voltage applied to said control member comprising a unidirectional conducting device connected between said field winding and said control means.

29. In combination, a dynamo-electric machine having armature and field windings, a source of current, means for variably energizing said field winding from said source comprising apparatus for transmitting thereto variable amounts of current, control means for said apparatus for producing a voltage which varies in response to an electrical condition of said machine, and means responsive to the energization of said field winding for limiting the range of voltage applied to said apparatus comprising a unidirectional conducting device connected between said field winding and said control means

ELMO E. MOYER.